United States Patent [19]

Hans et al.

[11] 3,722,359
[45] Mar. 27, 1973

[54] GEAR SHAPING APPARATUS

[76] Inventors: Joachim Hans, Hasenbergweg 12, Ettlingen/Baden; Hans Jorgen Ditschler, Albert-Braun-Str. 12f, Karlsruhe; Gerhard Russeler, Ahornweg 4, Bruchhausen, Germany

[22] Filed: Aug. 30, 1971

[21] Appl. No.: 176,055

[30] Foreign Application Priority Data

Aug. 29, 1970 Germany...................P 20 42 929.2

[52] U.S. Cl. ............................................90/7, 90/13 C
[51] Int. Cl. ................................................B23f 1/04
[58] Field of Search ............................90/7, 8, 3, 13 C

[56] References Cited

UNITED STATES PATENTS 3,587,384  6/1971  Ditschler..................................90/7

Primary Examiner—Gil Weidnenfeld
Attorney—Larson, Taylor & Hinds

[57] ABSTRACT

A gear shaping apparatus in which a work piece to be shaped into a gear and a cutting tool undergo relative rotational movement about their axes, reciprocating movement parallel to their axes, and engaging/disengaging motion whereby their axes move towards and away from each other. A separate continuously operable computer operated control device is provided for causing each of these movements, each of the control devices being operable mechanically independently of the others.

9 Claims, 2 Drawing Figures

INVENTORS
JOACHIN HANS
HANS J. DITSCHER
GERHARD RUSSELER

BY Larson, Taylor and Hinds
ATTORNEYS

3,722,359

GEAR SHAPING APPARATUS

BACKGROUND OF THE INVENTION

This invention relates to gear shaping apparatus, and in particular it relates to a gear shaping apparatus of the type in which relative rotational, axial and transverse movement is provided between a cutting tool and a work piece, such relative movements being varied during the cutting stroke to provide gears of various shapes and profiles, such a device being disclosed and claimed in U.S. Pat. No. 3,587,384, by Hans Ditschler, who is one of the inventors herein. The present application is an improvement of the apparatus disclosed and claimed in that patent.

It is known to produce gears by rotating a work piece to be formed into a gear relative to a rotating cutting tool or cutting wheel by applying the cutting wheel to the work piece in both the radial and the axial direction of the latter while rotating the work piece and the cutting wheel in opposite directions. When cutting external gear teeth the distance between the said axes is determined by the sum, and when cutting internal gear teeth the distance is determined by the difference of the pitch circle radii. Conversely, of course, the work piece can be moved towards and away from the cutting wheel, as the axis of the latter remains stationary. Suitable means such as a gear train or the like are provided between a drive means or several drive means and the work piece and the cutting wheel for rotating the latter. Normally the ratio of the rotative speeds of the work piece and the cutting wheel is equal to the reciprocal of the ratio of the number of teeth, or of the pitch circular radii of the work piece and the cutting wheel. During the production of the gear teeth it is also necessary to impart axial movement to the cutting wheel relative to the work piece. Thus, during a working stroke the two wheels are engaged while rotating in opposite directions and while moving axially relative to each other. After each working stroke, the cutting wheel and the work piece are separated from each other so that the cutting wheel can return to its initial position during a return stroke without contacting the work piece. The procedure for separating the work piece and the cutting wheel depends upon the type and shape of the teeth being produced. For example, the relative movement between the wheels may take place along the line connecting the axes of the two wheels. Alternatively, the separation movement may take place along a line formed at an angle to the said connecting line in order to impart a particular shape to the teeth being formed on the work piece.

Where a relatively large depth is desired between the teeth of the gear, it may be necessary to form the gears in several rather than a single rotation of the work piece. For each rotation of the work piece cutting wheel or the work piece is moved towards the other wheel through a suitable cam or the like so that the axial distance between the cutting wheel and the work piece is changed either stepwise or continuously from an initial depth to a larger depth.

Thus, the production of gear teeth normally involves a rolling engaging movement between the cutting wheel and the work piece together with selected relative movement of the work piece and the cutting wheel towards and away from each other.

In known gear shaping apparatus, the rolling movement between the cutting wheel and the work piece is produced by a rolling gear train with a fixed transmission ratio which is calculated from the ratio of the number of teeth of the gear elements and from the ratio of the pitch circle radii of the cutting wheel and the work piece. This fixed transmission ratio provides a pure rolling movement of the pitch circles of the cutting wheel and the work piece on each other.

However, for forming a particular type of gear, it is necessary to use a specialized machine which is normally quite complicated and which is limited in its use to the formation of the said particular type of gear teeth. For example, the gear teeth which narrow in the axial direction are obtained by conical movement of the work wheel by inclining the axis of the cutting wheel relative to that of the work piece. Convex tooth flanks are produced by a relative radial motion along corresponding guide surfaces between the cutting wheel and the work piece. In some cases the formation of a particular type of gear requires a very specific relative movement between the work piece and the cutting wheel during the step of separating the two wheels from each other. Further relative adjustments between the work piece and the cutting wheel are necessary to correct for such factors as distortion due to hardening. In presently known machines extensive work is required to perform such adjustments. In some cases the cross-sectional area of the tooth space is to be divided between preceding and succeeding tooth flanks of the cutting wheel, for which tangential relative movement is required between the cutting wheel and the work piece.

In the previous U.S. Pat. No. 3,587,384, a solution was provided for the first time showing how to adopt the machine to the various requirements while avoiding making complicated changes in the machine itself. The solution of the said patent was to provide, in addition to the usual means for providing relative rotational, axial and engaging movement of the cutting tool and in the work piece, a superimposed gear mechanism in order to superimpose additional movements onto the normal driving movements. However, while the said previous patent did solve the problem of providing different movements for cutting gears of different shapes without changing machine parts, it did so while adding a certain additional complexity and hence a certain additional expense to the apparatus.

Thus, there exists a need for a gear shaping apparatus of the type described and which accomplishes the results of the said previous patent, but which is more simplified than the apparatus shown in the previous patent.

SUMMARY OF THE INVENTION

Thus, it is a purpose of the present invention to provide a gear shaping apparatus of the type described but which is substantially simplified relative to the previous device as shown in the said earlier patent.

This purpose of the present invention is achieved by providing the cutting wheel and the work piece with mechanically independent rotary drives which can be controlled individually and continuously. In addition, mechanically independent and continuously and individually controllable drives are provided for (a) the means for providing relative axial movement between the cutting wheel and the work piece, (b) the means for moving the cutting tool towards and away from the work piece, and (c) the means for moving the work piece towards and away from the cutting tool.

It is already known that individual drive mechanisms can be provided for rotary movements which produce rolling movements wherein the relative rotational speeds of the separate drives are controlled with precision. However, in the case of gear shapers where large thrust-like tangential forces and high torque loads occur, for example in the production of slotted helical spur gears, it was not to be expected that independent driving systems would have sufficient strength and rigidity with respect to each other to be precisely controlled if not mechanically interrelated to each other.

In a preferred arrangement of the invention, separately controllable drives are provided not only to control relative rotational movement of the cutting tool and the work piece about their axes, but also relative reciprocating movement parallel to the axes and engaging/disengaging movement of the cutting tool and the work piece as their axes move towards and away from each other. Out of all available relative movements of the cutting wheel and the work piece, the movements applicable during any given operation are dependent upon the specific nature of the gear being formed during that operation. The nature of the gear being cut will therefore determine which movements are employed, and the speed and direction of such movements. For a given gear shape, there is therefore a precise combination of movements which must be carefully followed in order to assure economical production of a gear with the required precision. In the case of traditional machines, such care and precision is achieved by mechanical gear trains with shafts, gears, which are all mechanically interrelated. However, such constructions are quite expensive because they must be made with the highest level of precision.

Despite the high costs thereof, traditional gear shaping machines are not satisfactory because they lack sufficient controllability and adjustability for varying the relationships between the various movements for producing gears of various shapes and sizes. To provide such adjustability, it was often necessary to disassemble and reassemble the machines with new parts. But this approach was most unsatisfactory because the economical production of a given gear would often require different movements during the same operation, for example, a change in direction or speed during a given cycle such as a first speed during the downward stroke of the cutting tool and a different speed during the return stroke. The division of the cross-sectional surface of the work piece to be cut in accordance with a certain cutting technique can make an additional turn of the cutting wheel or the work piece desirable or necessary, that is a temporary change in the average rotational speed of both parts. In the case of non-circular gears, the rotational movement and the movement of the cutting wheel and the work piece towards and away from each other must be changed continuously according to the laws of kinematics and the geometry of the gear shape being formed. Production of prime gears each time requires a change gear with the pertinent prime number whenever the desired rotational speed can be produced by the exchange of gears in the rolling gear train. In such a case, one would always have to have an uneconomically large set of change gears available at all times.

With the apparatus according to the present invention, all variations of movement of the various parts can be provided in the most simple manner, even those movements which require a very special functional interdependence of the speed or direction of movement of one or both of the cutting tool and/or the work piece. For example, the axial thickness of the work piece can be divided into two separate portions, during a first portion of which the cutting tool moves in one direction, and through a second portion of which the cutting tool moves in a different direction, thereby providing an advancing and a lagging tooth flank. Additional complicated shapes can be provided by controlling the rotational movement of the cutting tool and/or the work piece in dependence on the movement of the cutting wheel and the work piece towards and away from each other or in dependence on the relative reciprocating movement of the cutting wheel and the work piece parallel to their axes.

The present invention also offers the possibility of providing conventional circular gears in a very simple manner whether the circular gears are cut in a standard way or with partial curves returning within themselves and constantly changing within the axial thickness of the work piece.

The optimum selection of the above mentioned individual movements of the gear shaping apparatus take place in a known manner utilizing a punchcard or magnetic tape, etc., utilizing a conventional electronic computer. At the same time, the actual values obtained continuously via corresponding signal arrangements are compared with the theoretical values fed into the computer and are corrected by way of corresponding servo controls. The specific details of the computer and the means for feeding the computer such as the punchcard or the magnetic tape, etc., are known per se and do not form a part of the present invention.

Thus, it is an object of the present invention to provide a new and improved gear shaping apparatus.

It is another object of the invention to provide a new and improved gear shaping apparatus in which relative movement between a cutting wheel and a work piece can be varied over a very large range but wherein the apparatus itself is vastly simplified.

It is another object of this invention to provide a gear shaping apparatus in which a wide range of gear shapes can be provided by controlling each of a plurality of relative movements between the cutting wheel and the work piece by mechanically independent and continuously controllable control means.

It is another object of this invention to provide a gear shaping apparatus of the type described in which the widest possible range of relative movements between the cutting wheel and the work piece are provided by controlling each movement mechanically independent of the others, utilizing separate and continuously operable control means, wherein all of the various controls are interrelated by a computer.

Other objects and the advantages of the present invention will become apparent from the detailed description to follow, together with the accompanying drawings.

BRIEF DESCRIPTION OF THE DRAWINGS

There follows a detailed description of preferred embodiments of the invention to be read together with the accompanying drawings.

DETAILED DESCRIPTION OF THE PREFERRED EMBODIMENTS

There follows a detailed description of preferred embodiments of the invention wherein like numerals represent like elements throughout the several views. Further, although relative terms such as "up," "down," "left," and "right," will be used throughout the detailed description of the specification, it is to be understood that such terms are used only to clearly explain the invention with respect to the illustrated views thereof, and that the invention is capable of assuming other orientations in practice.

Figure 1:
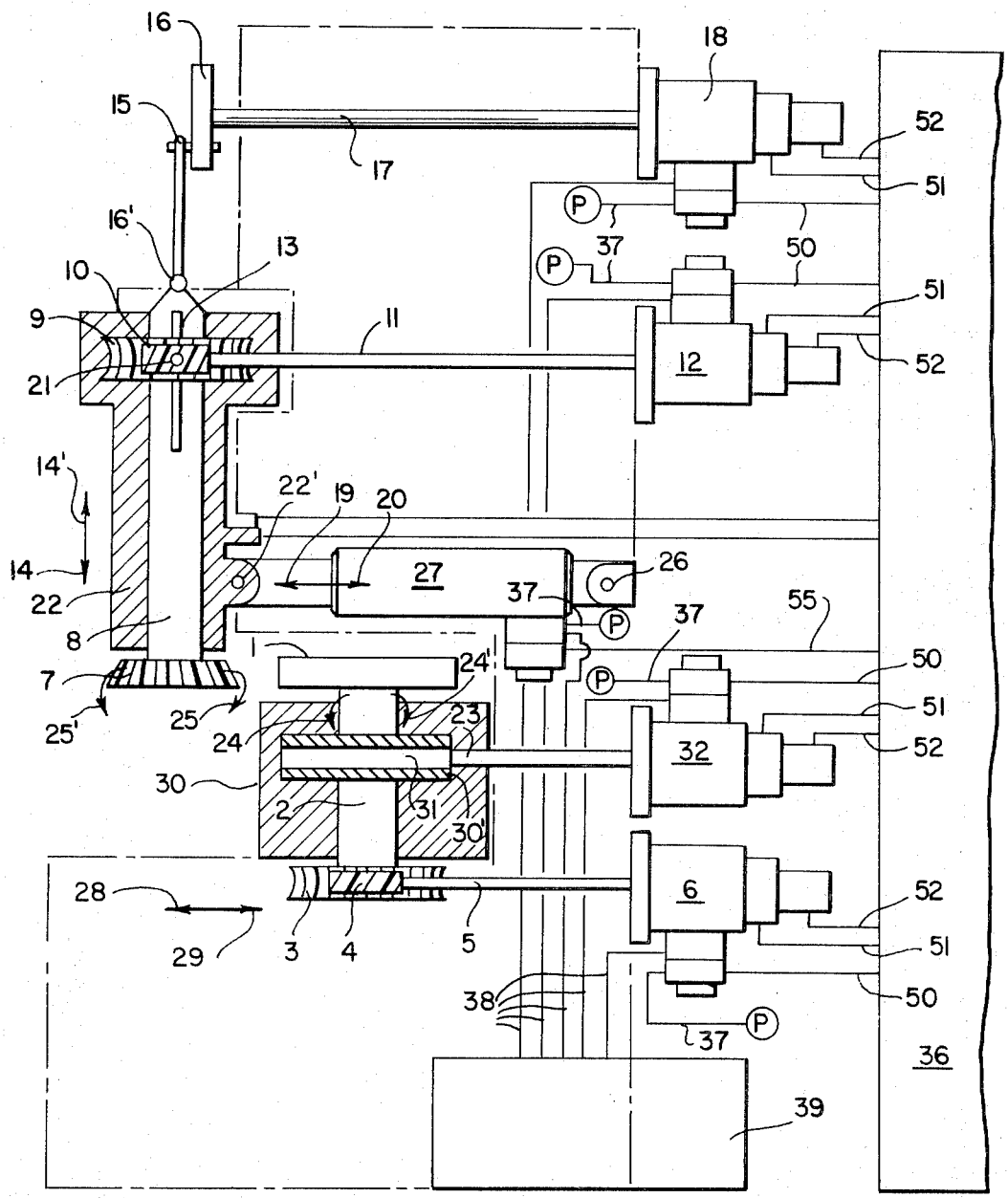
FIG. 1 is a schematic view showing a gear shaping apparatus of the present invention.

Referring to FIG. 1, a work piece 1 to be formed into a gear is mounted by means (not shown) onto a rotatable work piece spindle 2 supported in a carriage 30 for rotational movement about its axis in both directions as indicated by arrows 24 and 24'. Fixedly connected to the spindle 2 is a gear 3 which is rotated by engagement with a worm gear 4 which is in turn operated by its connection through shaft 5 with a servo drive 6. In a manner to be described in greater detail below, this servo drive is controlled by fluid through lines 37 and 38 to a source of pressure fluid and drain, respectively, while lines 50, 51 and 52 lead to a computer 36.

Adjacent the work piece 1 is a cutting tool 7, also referred to as a cutting wheel which is fixedly mounted on a spindle 8 for rotation therewith in both directions as indicated by the arrows 25 and 25'. The spindle 8 includes an outwardly projecting axially extending key 13. A gear 9 is mounted on the spindle 8 and includes a slot for receiving the key 13 whereby the spindle 8 must rotate with the gear 9 but can slide axially relative thereto. The gear 9 is turned by its connection with a worm gear 10 which is in turn connected through a shaft 11 with a servo drive 12 which is similar in all respects to the servo drive 6.

Vertical movement of the spindle 8 in the direction of the arrows 14 and 14' is provided by means of a crank drive 16 which is connected to a crank arm 15 which is in turn connected to a universal joint 16' at one end of the spindle 8 such that turning movement of the shaft 17 about its axis causes vertical movement of the spindle 8.

Although the longitudinally extending key 13 is shown as being parallel to the axis of the spindle 8, in practice, this key can be in the shape of a helix extending about the spindle 8. This would be suitable, for example, in the production of helical or worm gears.

The shaft 17 is operated by a servo drive 18 which is similar to servo drives 6 and 12.

The rotational speeds of the two servo drives 6 and 12 are controlled by suitable programs stored in punchcards, magnetic tapes, etc., such that they correspond to the relationship of the pitch circle radii in the case of round and non-circular gears. In this case, it is also possible to feed in corresponding adjusting movements in order, for example, to produce tapering tooth flanks or tooth flanks which are longitudinally convex in an axial direction. Also, corrections which become necessary due to hardening distortions can be taken into account in this manner. Furthermore, the cross-sectional surface of the tooth space, that is the distance through its axial thickness, can be divided into two or more portions and each portion can be cut differently by controlling the signals delivered to the servo motors 6, 12 and 18. It is also possible to impart a higher upward return stroke in the direction of arrow 14' than the downward operating stroke 14.

To provide engaging and disengaging movement of the cutting wheel 7 towards and away from the work piece 1, the spindle 8 is mounted in housing 22 connected at a joint 22' to one end of a fluid driven piston and cylinder unit 27. The opposite end is pivotally connected at 26 to a fixed part of the apparatus. A suitable valve for controlling operation of the unit 27 includes fluid pressure and drain lines 37 and 38 and a line 55 to the computer 36. Movement of the unit 27 in a direction of the arrows 19 and 20 provides lateral movement of the housing 22 and also the spindle 8 and the cutting mechanism 7 about a pivot axis shown diagrammatically at 21. As is known in the art, the relative movement between cutting wheel 7 and work piece 1 is sufficiently small that upon said relative movement the engagement between gears 9 and 10 is maintained in a manner also known per se by means of the play in the connection, such as a splined connection between worm gear 10 and its shaft 11.

Means are also provided for moving the work piece towards and away from the cutting tool. This means includes a threaded nut 30' fixedly mounted in the carriage 30 which also mounts the spindle 2. A screw 31 is located within this nut and threadedly engaged therewith such that by turning this screw the carriage 30 and hence also the spindle 2 and the work piece 1 are moved back and forth in the direction of the arrows 28 and 29. Such turning movement of the screw 31 is provided by turning the shaft 23 to which it is engaged by means of servo drive 32, this servo drive being similar in structure to the servo drives 6, 12 and 18.

The means for operating the cutting wheel and the work piece to cause these members to engage and disengage each other are quite important since certain tooth shapes require that these elements follow very specific paths as they engage and separate from each other. This is true, for example, when cutting grooves which do not extend all the way through the axial thickness of the work piece but are terminated intermediate the end thereof. The drive 27 must then be carefully controlled to move the cutting wheel away from the work piece at a precise point in time. Further, various tooth shapes can be provided by changing the relative speeds of rotation of the work piece and the cutting wheel during the process of separating these two parts from each other.

By properly arranging the separating movements in the direction of arrow 28 in cooperation with the rolling movements of the cutting wheel and work piece in the direction of arrows 24, 25, or 24', 25, and/or with axial double stroke movement, 14, 14' of the spindle 8, it will be possible to traverse on the most favorable path on which the cutting wheel will penetrate to the full depth of the tooth of the work piece. This information can be stored on a punchcard, magnetic tape, etc. and changes in the path which would result from experiences during production can then be quickly inserted into the program.

Figure 2:
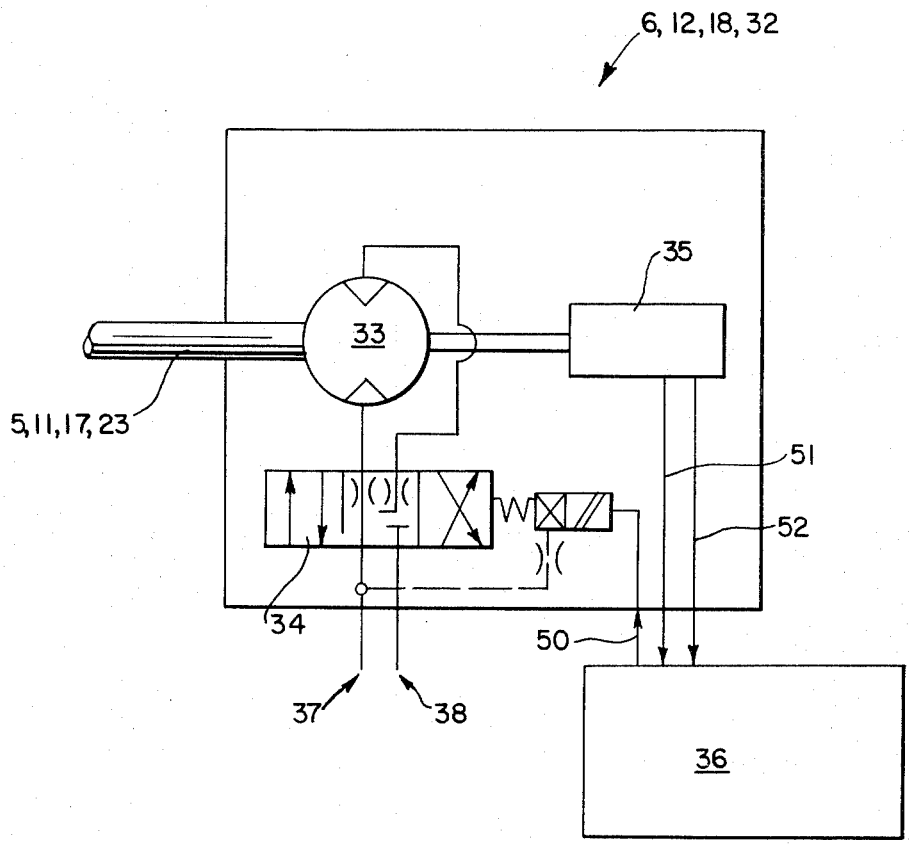
FIG. 2 is a schematic view of the servo drive unit shown in FIG. 1.

FIG. 2 illustrates a suitable servo drive as used for example at 6, 12, 18 and 32. A suitable line 50 from the computer controls the position of an electrohydraulic servo valve 34 which in turn controls the flow of pressurized fluid from a pump through line 37 and to a drain tank 39 through line 38. The three positions of the valve represent rotation of the shafts 5, 11, 17 and 23 in a first direction, cut off, and rotation of these shafts in the opposite direction, respectively. The speed of rotation of the shafts 5, 11, 17 and 23 is controlled by a signal device 35 which is connected to the computer 36 through suitable lines 51 and 52. The piston and cylinder unit 27 may also be controlled by a valve such as valve 34 connected by line 55 to the computer.

In the computer 36, the actual values of direction and speed of the shafts are compared with theoretical values. As is well known, theoretical values may be fed to the computer via punchcards, magnetic tape, etc.

Although the invention has been described in considerable detail with respect to preferred embodiments thereof, it will be understood that the invention is capable of numerous modifications and variations apparent to those skilled in the art without departing from the spirit and scope of the invention as defined in the claims.

We claim:

1. A gear shaping apparatus comprising a means for holding a work piece to be shaped into a gear, a cutting tool having a cutting edge, rotating means for providing relative rotational movement between the cutting tool and the work piece, means for providing relative reciprocation between the cutting tool and the work piece in a direction parallel to their axes, wherein said cutting edge, during a cutting stroke of the cutting tool, cuts a gear tooth profile in the work piece, said rotating means comprising a first control means for controlling the speed of rotation of the cutting tool and a second control means for controlling the speed of rotation of the work piece, said first and second control means being controllable continuously and each being mechanically independent of the other.

2. A gear shaping apparatus according to claim 1, including a means for providing movement of the cutting tool into and out of engagement with the work piece, a third control means for controlling the movement of the cutting tool into and out of engagement with the work piece, said third control means being controllable continuously and being mechanically independent of the said first and second control means.

3. A gear shaping apparatus according to claim 2, including a means for providing movement of the work piece into and out of engagement with the cutting tool, a fourth control means for controlling the movement of said work piece into and out of engagement with the cutting tool, said fourth control means being controllable continuously, and being mechanically independent of the said first, second and third control means.

4. A gear shaping apparatus according to claim 3, wherein said means for providing relative reciprocation between the cutting tool and the work piece comprises a fifth control means, said fifth control means being controllable continuously and mechanically independently of the said first, second, third and fourth control means.

5. A gear shaping apparatus according to claim 1, including a means for providing movement of the work piece into and out of engagement with the cutting tool, a further control means for controlling the movement of the work piece into and out of engagement with the cutting tool, said further control means being controllable continuously and mechanically independently of the said first and second control means.

6. A gear shaping apparatus according to claim 1, including a further control means for controlling the means for providing relative reciprocation between the cutting tool and the work piece, said further control means being operable continuously and mechanically independently of the said first and second control means.

7. A gear shaping apparatus according to claim 1, wherein, during a cutting stroke of the cutting tool, said cutting tool cuts completely through the axial width of the gear, and wherein said first and second control means include means for varying the relative rotational speed between the work piece and the cutting tool during the cutting stroke as the cutting tool cuts through the axial width of the gear.

8. A gear shaping apparatus according to claim 1, wherein each of said control means comprises a variable speed fluid motor, a signal device for controlling the speed of the motor, and a valve device for controlling the flow of pressurized fluid to the motor.

9. A gear shaping apparatus according to claim 8, including a computer means for controlling the operation of said valve and said signal devices, whereby both of the control means operate in cooperation with each other from a common computer control.

* * * * *